Dec. 19, 1967  N. G. TRIBE  3,358,812
CONVEYOR SYSTEM FOR MOVING SOLIDS OVER LONG DISTANCES
Filed Feb. 23, 1966  4 Sheets-Sheet 2
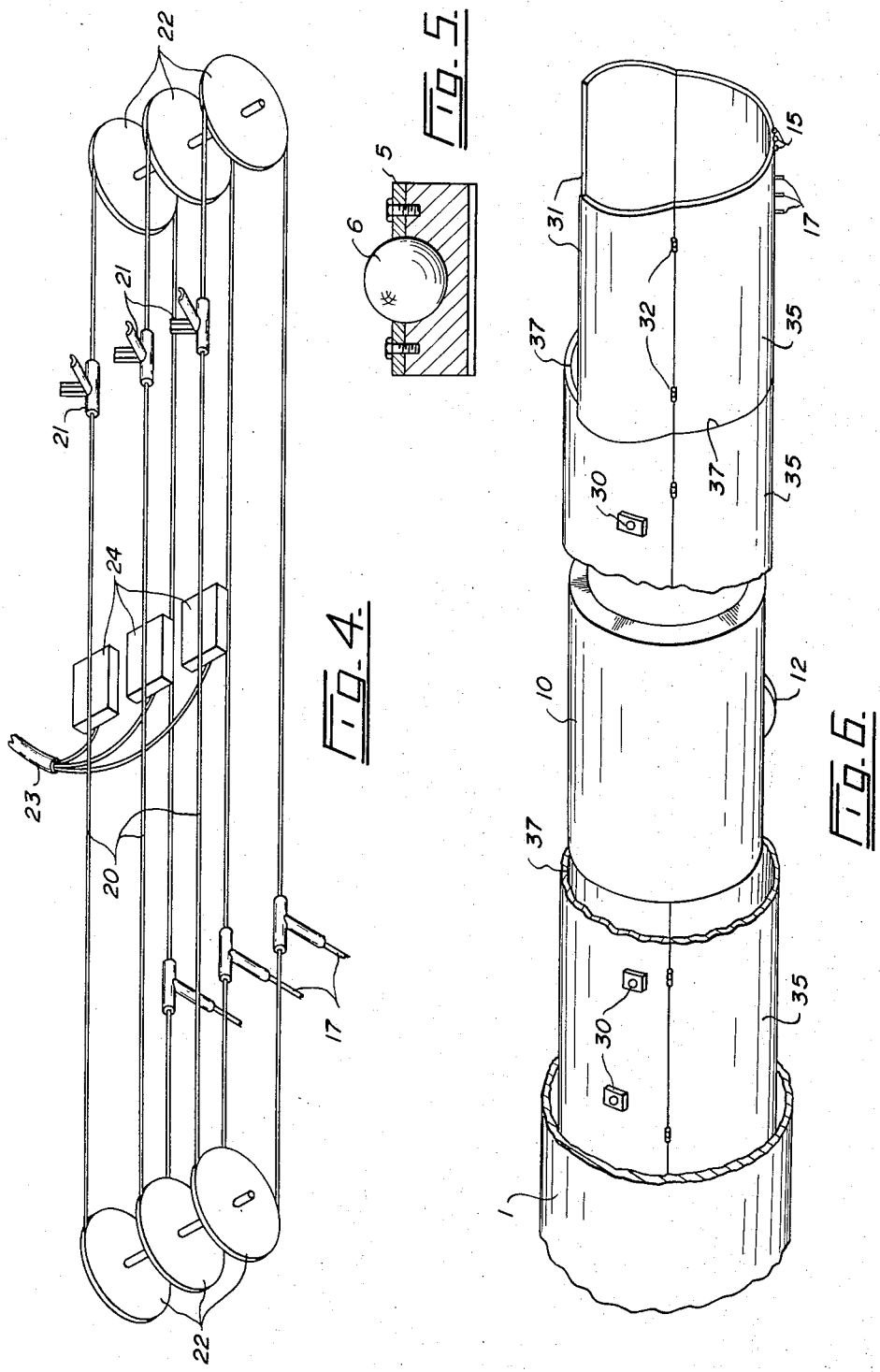
INVENTOR
NORMAN GEORGE TRIBE
BY
ATTORNEY Dec. 19, 1967  N. G. TRIBE  3,358,812
CONVEYOR SYSTEM FOR MOVING SOLIDS OVER LONG DISTANCES
Filed Feb. 23, 1966  4 Sheets-Sheet 3
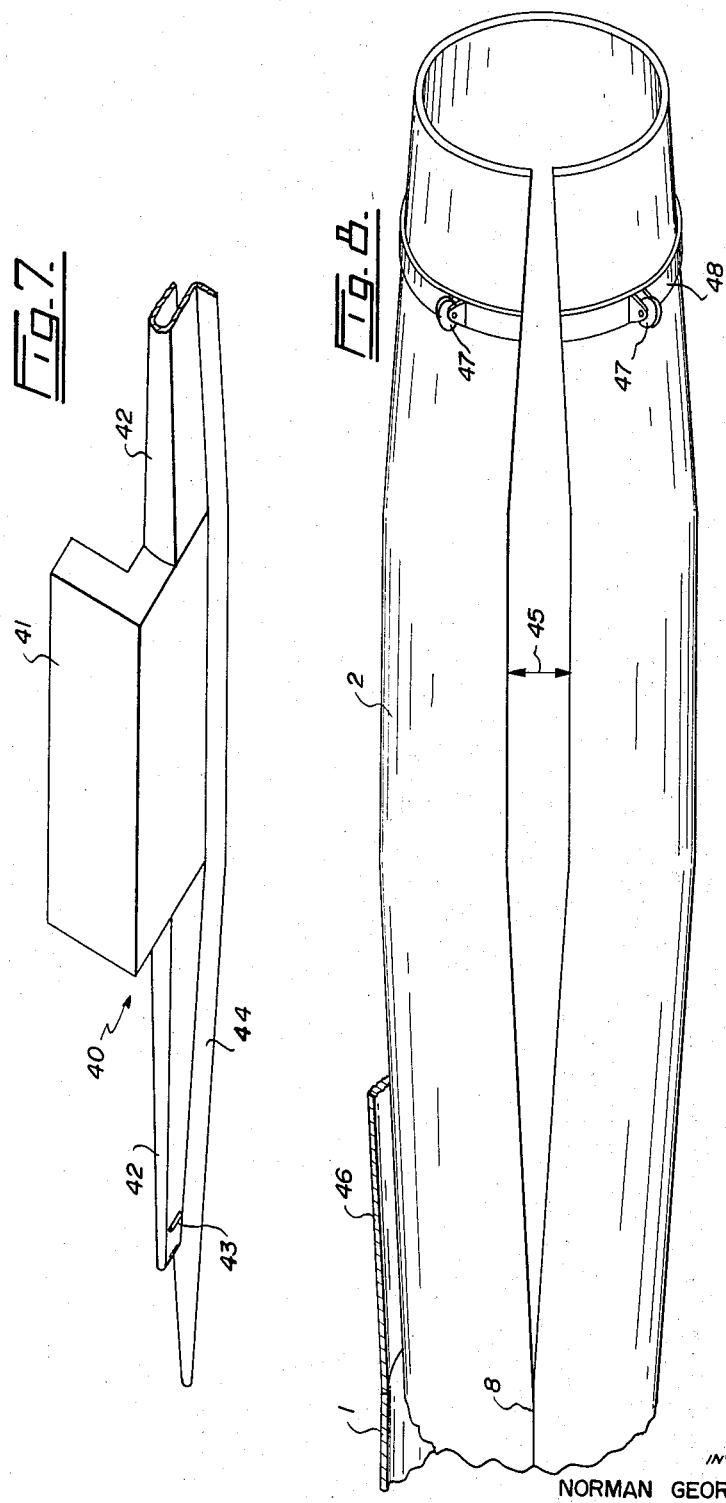
INVENTOR
NORMAN GEORGE TRIBE
BY
ATTORNEY Dec. 19, 1967  N. G. TRIBE  3,358,812
CONVEYOR SYSTEM FOR MOVING SOLIDS OVER LONG DISTANCES
Filed Feb. 23, 1966  4 Sheets-Sheet 4

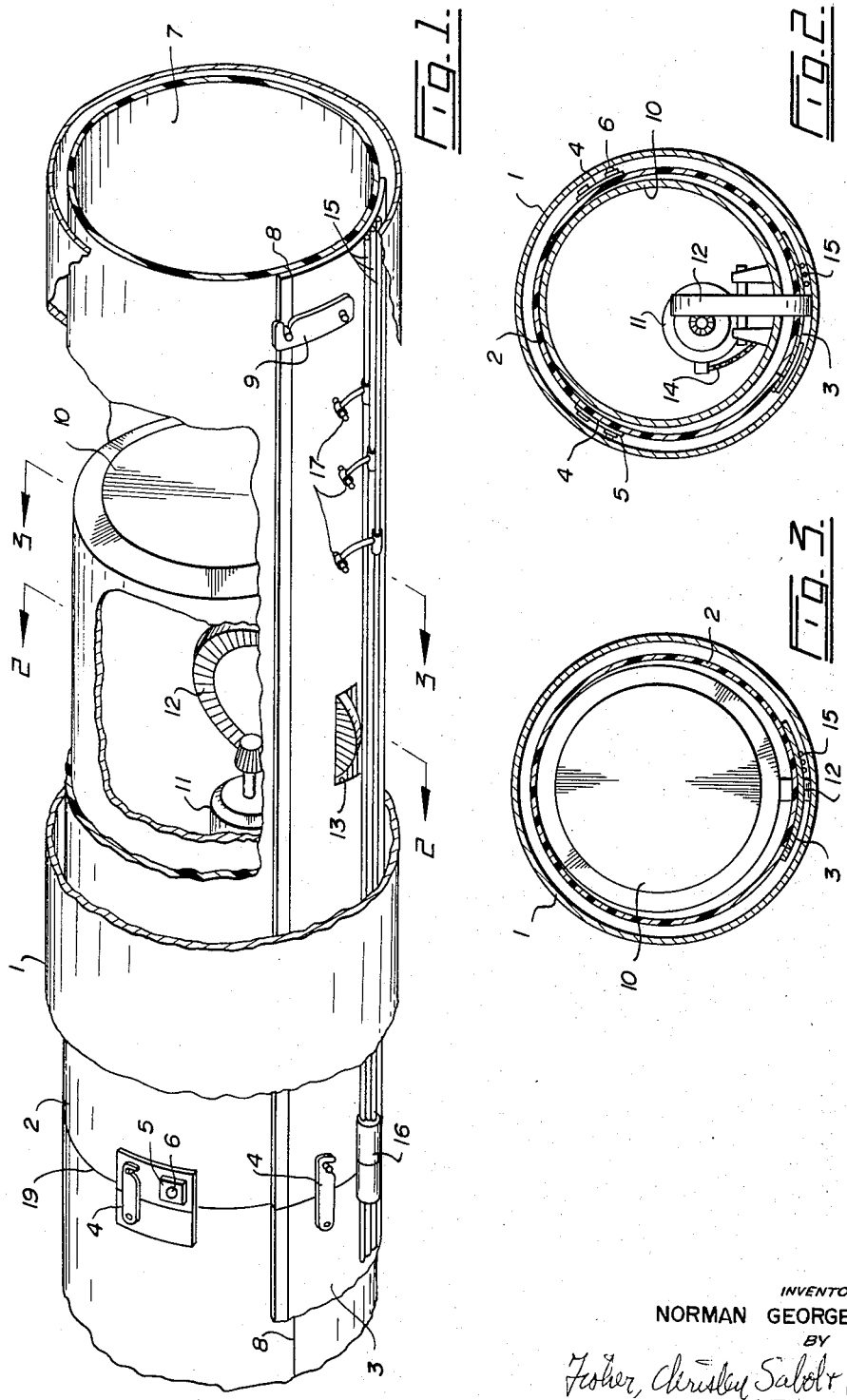

INVENTOR
NORMAN GEORGE TRIBE
BY
Fisher Christen Sabol + Caldwell
ATTORNEY

United States Patent Office 3,358,812
Patented Dec. 19, 1967

3,358,812
CONVEYOR SYSTEM FOR MOVING SOLIDS OVER LONG DISTANCES
Norman George Tribe, 42 Houltain Crescent, Regina, Saskatchewan, Canada
Filed Feb. 23, 1966, Ser. No. 529,571
9 Claims. (Cl. 198—184)

This invention relates to a conveyor system for moving solids over large distances.

There is a great demand for improved systems for moving products such as coal, wheat, etc. over large distances by means of pipelines. Coal has been transported through pipelines as a slurry in water, but this creates pumping problems and also involves the added expense of drying the coal when it reaches its destination. It also has the disadvantage that a large amount of water must be transported with the coal in the pipeline.

The slurry system is, of course, not satisfactory for shipping materials such as wheat and some attempts have been made to transport materials of this type, which would be damaged by water or oil, in sealed capsules, these capsules being carried along in the pipeline suspended in a liquid such as petroleum oil. This system also has pumping problems as well as the very great problem that any leakage in the capsule will contaminate the cargo in the capsule.

The transportation system according to this invention overcomes the above disadvantages in moving solid materials by pipeline by providing a completely mechanical and electrical system involving no fluid flow. The system of the invention includes a series of open end containers which connect together to form a continuous conveyor of any desired length within a pipeline or carrier pipe. Each of these containers is arranged to be opened along its entire length so that when the containers are connected together they form a continuous conveyor which can be continuously opened and closed. The containers can be either square or rounded depending on the shape of the pipe in which they are carried and can be made from a rigid or relatively flexible material. When a flexible material is used, a rigid framework is necessary to support each container.

The containers can be carried on rollers positioned within the pipeline or each container may have wheels or rollers which roll on the interior surface of the carrier pipe. It is also possible to support the containers without wheels or rollers by coating sliding surfaces on the outside of the container and the inside surface of the pipeline with a self-lubricating plastic such as Teflon.

The propulsion system for the conveyor is a series of electric drive units positioned at regular intervals within the conveyor, e.g. up to several hundred feet apart. Each drive unit is in the form of a closed capsule which fits within a container and consists of an electric motor and a drive wheel or electrically powered compressor supplying compressed air to air jets. The drive wheel projects through an opening in the capsule and the container and engages the inside wall of the pipe carrying the conveyor. Power is supplied to the motors by means of special electrical circuits as described later in this specification.

Material is loaded into the conveyor by means of a loading chute which continuously enters the conveyor by spreading a continuous longitudinal slit in the conveyor. The material is preferably unloaded by means of a suction probe which continuously enters the conveyor in the same manner as the loading chute.

With the system of this invention, it is particularly desirable to use tandem pipelines or a closed loop so that the conveyor can return from one loading and unloading station to another in either empty or full condition.

The invention will now be illustrated by reference to the attached drawings in which:

FIG. 1 is a perspective view of the conveyor system with broken away sections showing internal portions of the device;

FIG. 2 is a sectional view through line 2—2 of FIG. 1;

FIG. 3 is a sectional view through line 3—3 of FIG. 1;

Figure 9:
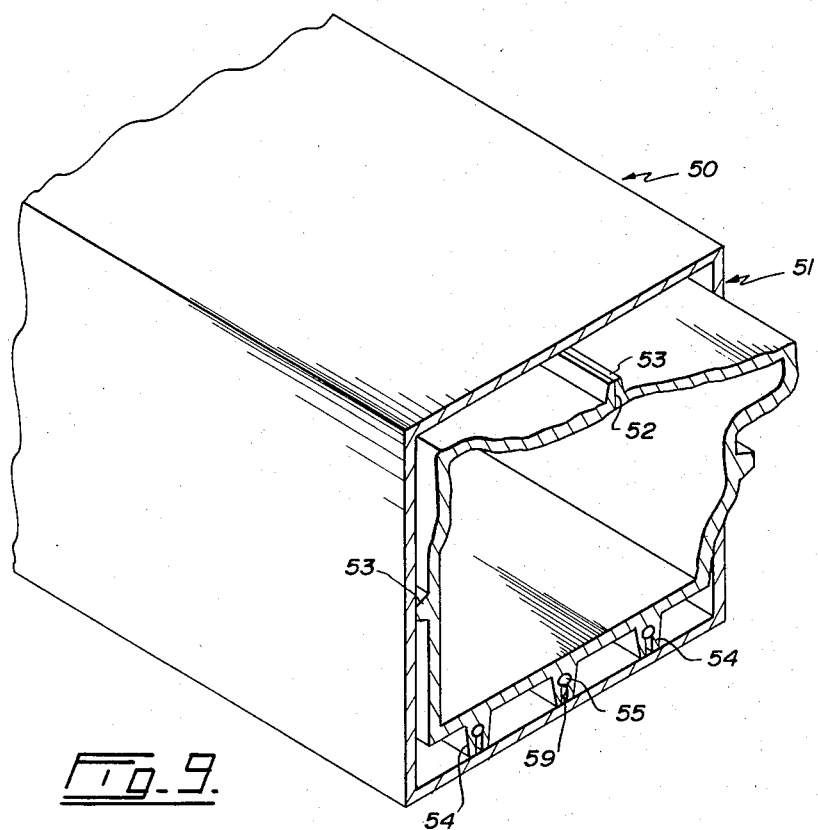
Figure 10:
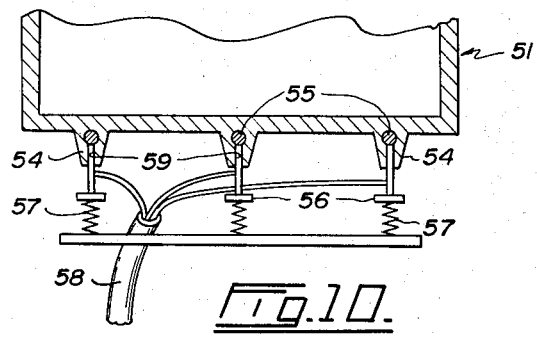

FIG. 4 schematically illustrates a system for supplying electric power to the motor capsule;

FIG. 5 is a detail sectional view of a guiding ball mount for the conveyors;

FIG. 6 is a perspective view of the conveyor system showing a door mechanism for loading and unloading;

FIG. 7 is a perspective view of a loading mechanism;

FIG. 8 is a perspective view of the conveyor with the longitudinal joint spread to pass the loading mechanism;

FIG. 9 is a perspective view of the conveyor system showing sliding supports; and FIG. 10 is a sectional view showing an alternative power supply system.

In the embodiment of the invention illustrated in FIGS. 1, 2 and 3, a pipeline 1 is shown with broken-away sections exposing a tubular conveyor 2. The conveyor 2 is preferably made from a reinforced plastic which has some flexibility and is formed in sections joined at joints 19 by means of locking devices 4. Conveyor 2 is supported on a rigid arcuate support 3 and has a longitudinal joint 8 which can be opened and closed for loading and unloading the conveyor. The longitudinal joint is held closed by means of latches 9. Rotatable balls 6 and ball mounts 5 serve as guides for positioning the conveyor 2 in the pipeline 1.

A broken-away section in conveyor 2 reveals a motor capsule 10 positioned within the conveyor. A still further broken-away section in capsule 10 shows a motor 11 which drives a drive-wheel 12. The drive-wheel 12 passes through a hole 13 in the capsule, conveyor and support and contacts the bottom of pipeline 1, providing the driving force for the conveyor. Motor capsules of this type are positioned at regular intervals along the conveyor with load carrying areas 7 between capsules. A series of idler wheels similar to the drive wheels can also be provided to support the conveyor between the drive wheels.

Electric current is supplied to motor 11 by electric cable 14 which is connected to three insulated electric wires 15 fixed on the conveyor. The electric lines 13 are joined together at each conveyor joint 19 by means of connector 16. Fixed contacts 17 project from lines 15 and contact moving electrical lines as shown in FIG. 4.

A series of power supply stations are provided along the pipeline for supplying electric power to the contacts 17 and the main components of such a power system is shown in FIG. 4. Each power supply station includes a series of moving wires 20 on which there are clamp type contactors 21 which are arranged to engage the contacts 17 as they pass the station. The contactors 21 are positioned such that the distance during which contactors 21 are engaged with contacts 17 is slightly greater than the distance between contacts 17 so that there is no interruption in the supply of electric power to the motor. Each wire 20 moves in a closed loop around insulated pulleys 22 and power is supplied to the moving wires by means of power cables 23 and sliding contacts 24.

In the arrangement shown in FIG. 6, the carrier pipe 1 carries within it a conveyor pipe consisting of rigid segments 35 connected together by connector joints 37. These rigid segments 35 are made from sheet metal or reinforced plastic and are provided with openable doors 31 mounted on hinges 32. A series of ball mounts 30 are also provided on the conveyor to position it within the carrier pipe 1.

A broken-away section is once again shown in this drawing, revealing motor capsule 10 with the projecting drive wheel 12 and the electrical contacts 15. This motor capsule is driven in the same manner as the capsule shown in FIG. 1.

The doors 31 can be opened by means of spreading which continuously engages the joint 37 between the two doors or projections may be provided on the outside of the doors which engage a spreading device. After loading, the doors are closed by providing a tapered portion in the carrier pipe which gradually reduces in diameter down to the diameter of carrier pipe which carries the conveyor in closed position. The doors 31 are maintained in closed position between loading and unloading stations by means of ball mounts 30 which maintain a close contact with the interior surface of the carrier pipe.

FIGURE 7 shows a loading chute 40 having a hopper 41. A longitudinally tapering projection 42 is fixed to the outlet of hopper 41 and serves to spread open the longitudinal slit in the conveyor. Rollers 43 can be provided adjacent the forward end of the spreader 42 to aid in the spreading open of the longitudinal slit. The edge of the spreader 42 remote from the hopper 41 has a longitudinally extending flange 44 fixed thereto. This flange travels inside the conveyor and seals the edges of the longitudinal opening in the conveyor as it spreads to pass around the spreader 42, thus preventing material from spilling out of the conveyor as it is being fed in through the loading chute. The flange 44 is made quite thin so that it projects only a short distance into the conveyor and is able to pass the motor capsules without interference.

FIGURE 8 shows the manner in which a flexible conveyor segment 2 spreads open as it passes the loader of FIGURE 7. Thus it will be seen that the longitudinal slit 8 is spread the distance shown by the numeral 45 as it passes the loader. It will also be noted that the carrier pipe 1 is provided with an expanded section 46 to accommodate the conveyor when spread open.

In this embodiment the segments of the conveyor are supported and positioned within the carrier pipe by means of support wheels 47 mounted on annular mounting 48.

FIGURE 9 shows yet another embodiment of the invention in which a carrier pipe and conveyor of rectangular cross-section are used. Carrier pipe 50 contains a conveyor 51 having a continuous longitudinal slit 52 for loading and unloading material. The top and side walls of the conveyor 51 have projections 53 which position the conveyor 51 in the pipe 50 while the bottom wall of the conveyor 51 is provided with a series of projections 54 on which the conveyor 51 slides. The projections 53 and 54 can run continuously along the conveyor or they may be in the form of intermittent lengths.

In order that the conveyor will slide easily in the carrier pipe, the surfaces of the projections as well as the interior surfaces of the carrier pipe are coated with a self-lubricating plastic, such as Teflon. This plastic coating is particularly important for the projections 54 which support the conveyor.

The conveyor 51 is propelled by a motor capsule as described hereinbefore and electrical power is supplied by the system as shown in FIGURE 10. Bare electrical wires 55 are imbedded in the projections 54 with slots 59 providing continuous openings to the wires. The material in which the wires are imbedded is, of course, an insulating material.

A series of sliding contacts 56 supported by springs 57 are provided at periodic points along the pipeline and contact the wires 55, providing current to them from the electrical cable 58.

Granular or powdered material can be conveniently unloaded from the conveyor by means of a suction probe which continuously spreads the longitudinal slot and extends down to the bottom of the conveyor. The suction probe is movable in a vertical direction and guide tracks are provided at each motor capsule which raise the probe to pass over each capsule.

It will also be appreciated that this device can be adapted for the transportation of packages or individual objects by modifying the loading and unloading mechanisms. Thus packages or articles can be loaded by means of a chute extending into the continuously opened conveyor while they can be unloaded by means of a conveyor belt continuously extending into a continuously opened conveyor.

I claim:
1. A device for continuously transporting solid material over long distances comprising:
   (a) a rigid, generally closed, carrier pipe, having at least one loading station and at least one unloading station each formed as an opening in its wall.
   (b) a continuous closed conveyor adapted to travel within said carrier pipe and consisting of a series of open-ended sections which are connected together end to end, each such sections of the closed conveyor being formed as a belt with marginal portions joined together so as to constitute a longitudinal joint.
   (c) means to spread apart, and subsequently to close, said longitudinal joint at a loading station, and further means to spread apart, and subsequently to close said longitudinal joint at an unloading station.
   (d) electrically powered drive units positioned at regular intervals within the conveyor and comprising motor means, motor capsule means surrounding said motor means and fixed in relation to said conveyor to travel with and propel said conveyor and a plurality of frictionally engaging drive means extending from said capsule means through orifices in the conveyor and engaging the inside of the carrier pipe whereby they are adapted to propel the conveyor through the pipe line.

2. A device as claimed in claim 1 further comprising carrier wheels adapted to carry the conveyor in the carrier pipe.

3. A device according to claim 1 wherein fixed electrical conductors are provided along the tubular sections, said conductors having contacts which engage contacts on moving wires within the carrier pipe.

4. A device according to claim 1 wherein a series of guide members are provided on the tubular section which are adapted to engage the inside of the carrier pipe and maintain the longitudinal joint in closed position.

5. A device according to claim 1 wherein latch means are provided for holding the joint closed.

6. A device according to claim 1 wherein a suction probe is provided for unloading material from the conveyor.

7. A device according to claim 6 wherein the suction probe is movable in a direction permitting it to pass over the motor capsules.

8. A device according to claim 1 wherein the interior of the carrier pipe is lined with a self-lubrication plastic.

9. A device according to claim 8 wherein the conveyor is supported and guided in the carrier pipe by means of longitudinal projecting runners having a surface of a self-lubrication plastic.

References Cited

UNITED STATES PATENTS 1,427,553   8/1922   Schwinger _____ 198—184

FOREIGN PATENTS 709,701   6/1954   Great Britain.

EVON C. BLUNK, *Primary Examiner.*

R. E. AEGERTER, M. H. WOOD, Jr.,
*Assistant Examiners.*